United States Patent [19]
Nagazumi et al.

[11] 3,739,191
[45] June 12, 1973

[54] VEHICULAR DECELERATION SENSOR USING CAVIATION PHENOMENA IN ELECTRICALLY CONDUCTIVE LIQUID

[75] Inventors: Yasuo Nagazumi, Tokyo; Takeshi Mori, Yokohama, both of Japan

[73] Assignee: Nissan Motor Company Limited, Yokohama, Japan

[22] Filed: Aug. 25, 1971

[21] Appl. No.: 174,661

[30] Foreign Application Priority Data
Aug. 25, 1970 Japan................................ 45/73855
Mar. 31, 1971 Japan................................ 46/19536
Mar. 31, 1971 Japan................................ 46/19537
May 15, 1971 Japan................................ 46/32720
May 15, 1971 Japan................................ 46/32721

[52] U.S. Cl. ............ 307/121, 340/262, 200/61.47, 307/10 R
[51] Int. Cl. ............................................. H01h 35/00
[58] Field of Search........................ 340/261, 262; 200/61.47; 307/10 R, 10 AT, 116, 119, 120, 121

[56] References Cited
UNITED STATES PATENTS
2,802,115 8/1957 Datesman et al. ............ 200/61.47 X
3,232,119 1/1966 Salerno ........................ 200/61.47 X
3,602,049 8/1971 Albert.............................. 200/61.47
2,275,011 3/1942 Erich .............................. 200/61.47
3,555,219 1/1971 Johnson.......................... 200/61.47

*Primary Examiner*—Herman J. Hohauser
*Attorney*—Robert E. Burns and Emmanuel J. Lobato

[57] ABSTRACT

Vehicular deceleration sensor using cavitation phenomena in a confined electrically conductive liquid. The deceleration sensor includes a container provided stationary relative to a vehicle and defining a chamber confining therein the conductive liquid such as mercury. A first electrode is mounted on the container and protrudes into the chamber for electrically contacting with the liquid. At least one second electrode is also mounted on the container at a spacing from the first electrode and protrudes into the chamber for electrically contacting with the liquid. Cavitation means is included in the container for bearing upon a force of inertia of the liquid, when an accelerating force is applied to the container, and for being deformed by the inertia to form a cavity in the liquid between the first electrode and one of the second electrodes when the accelerating force is above a predetermined level. Deceleration of the vehicle can be detected by detecting at least one of the interruptions of electric current flowing between the first electrode and one of the second electrodes, in response to formation of the cavity. The characteristics of deceleration level and direction to be detected can be controlled by employing a suitable gate circuit in combination with the deceleration sensor.

18 Claims, 39 Drawing Figures

$S_3$: OPERATION REGION $S_1 + 2S_2$: QUASI-OPERATION REGION

VEHICULAR DECELERATION SENSOR USING CAVITATION PHENOMENA IN ELECTRICALLY CONDUCTIVE LIQUID

The present invention relates to a vehicular deceleration sensor and, more particularly, to a vehicular deceleration sensor using cavitation phenomena in an electrically conductive liquid.

Mechanical deceleration detectors have been developed which employ springs or the like. However, these conventional detectors are composed of such a great number of parts or elements that they have inherent drawbacks. Once they are operated for some purpose, they should be adjusted for the next use. Direction characteristics are poor and cannot be controlled freely. Aging of the parts invites inaccuracy of the deceleration level to be detected.

It is, therefore, a primary object of the present invention to provide a deceleration sensor using cavitation phenomena in a confined electrically conductive liquid.

Another object of the invention is to provide a deceleration sensor of the above type in which the deceleration level and direction to be detected is accurately controlled.

Still another object is to provide a deceleration sensor of the above type in which repeated use thereof is possible with sufficient reliability.

A further object is to provide a vehicular deceleration detecting device including the above deceleration sensor and gate circuit for producing an electric deceleration signal when the deceleration is above a predetermined level.

A further object is to provide a vehicular safety system including the above deceleration detecting device and a safety device of any type triggered by the detecting device.

Figure 1:
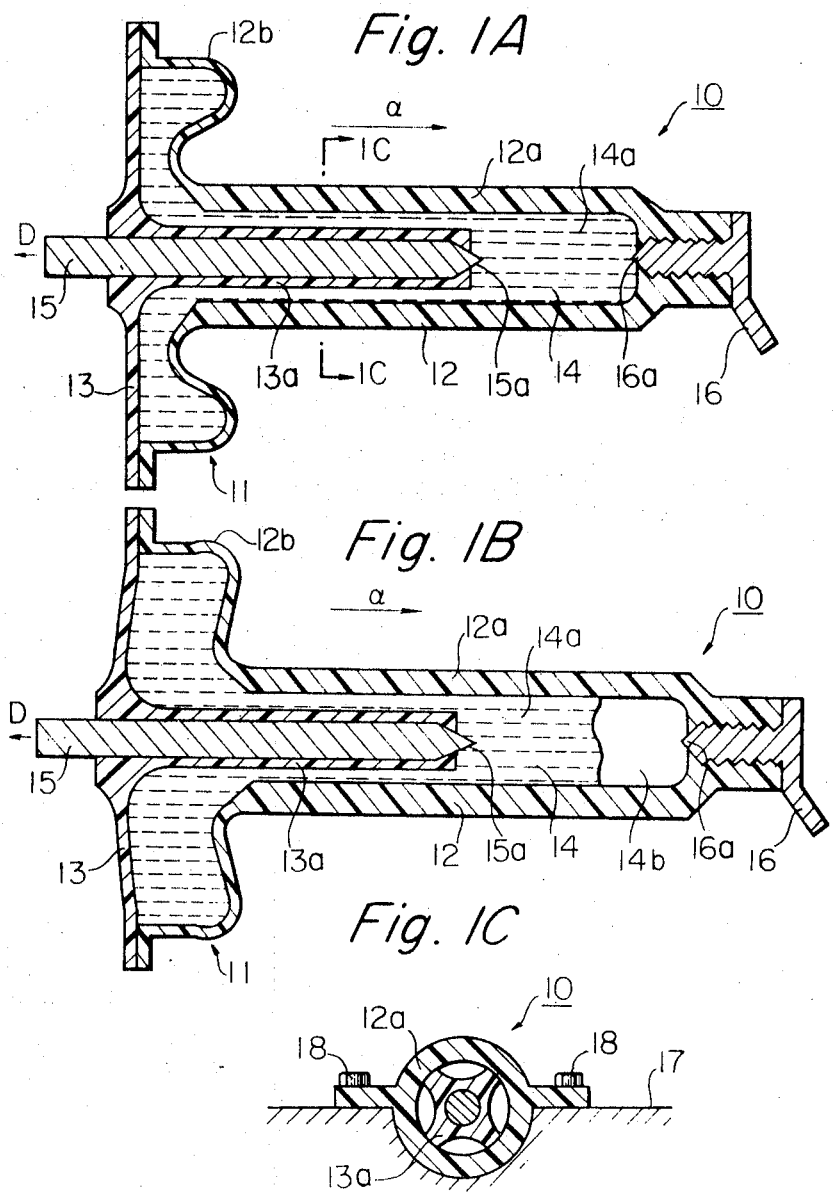
FIG. 1A is an axial sectional view showing an embodiment of a cavitation deceleration sensor of the invention.
FIG. 1B is similar to FIG. 1A but shows the situation at which a cavity is formed in operation.
FIG. 1C is a radial section taken on line 1C—1C of FIG. 1A.

Referring now to FIGS. 1A, 1B and 1C, one basic embodiment of the cavitation deceleration sensor of the invention, which will be hereinafter designated at numeral 10, is provided with a container 11 composed of a funnel-shaped normally horizontal tubular member 12 and a means defining a deformable interface including diaphragm member 13. The member 12 has a cylindrical portion 12a and expanded end portion 12b, both of which are made of a rigid and electrically insulating material such as some kind of synthetic resins. The diaphragm member 13 is, on the other hand, made of a flexible and electrically insulating material such as other kinds of synthetic resins, and is hermetically secured to the open end of the expanded end portion 12b of the member 12. Thus, the container 11 defines a chamber 14 which is filled with an electrically conductive liquid 14a, preferably having a large mass, such as mercury. The diaphragm member 13 has a tubular central portion 13a extending axially of the cylindrical portion 12a into the chamber 14, as shown. A first electrode 15 is hermetically interposed into the tubular central portion 13a, with its tip 15a protruding slightly into the chamber 14. Thus, the tip 15a is normally in electric contact with the electrically conductive liquid 14a. A second electrode 16, which is mounted on the member 12, is shown in this embodiment to be hermetically threaded into the closed end of the cylindrical portion 12a. The first electrode 15 may also be mounted on the housing 12 if it is spaced from the second electrode 16 and if its tip 15a contacts electrically with the liquid 14a. The tip 16a of this electrode 16 is also formed to protrude slightly into the chamber 14, normally providing electric contact with the liquid 14a. In this way, the two tips 15a and 16a are spaced at a distance from each other in an opposing relationship to each other, as shown.

As best seen from FIG. 1C, the member 12 of the deceleration sensor 10 is fastened, for example, to a vehicular body construction 17 by a suitable fastening means such as a plurality of bolts 18. The tubular central portion 13a of the diaphragm member 13 is axially slidably received by the cylindrical portion 12a of the member 12, so that the diaphragm member 13 can be warped axially of the housing member 12 together with the first electrode 15 when an external force is applied thereto.

Referring to FIG. 1A, the deceleration sensor 10 is arranged on the vehicular body construction 17, with the diaphragm member 13 positioned toward the advancing or forward direction of the vehicle (not shown), as illustrated by an arrow D. Between the two electrodes 15 and 16, a suitable level of electric potential is applied by an electric circuit (not shown), which will be explained in detail with reference to FIG. 4. In this way, FIG. 1A represents that the vehicle is in the normal running condition with an electric current flowing between the two electrodes 15 and 16.

When, in operation, a heavy deceleration is experienced in the vehicle due to, for example, a sudden collision of the vehicle with an obstacle, then the member 12 can be assumed to be accelerated in the direction of an arrow α, which is just the opposite direction of the arrow D. This is deduced from the fact that the deceleration sensor 10 together with the overall vehicle construction is assumed to be located on a stationary system of coordinates which has been moving at a constant speed before the heavy deceleration takes place. In fact, the electrically conductive liquid 14a will continue to move in the direction of the arrow D due to its inertia, which has a large value since the liquid itself has a large mass. Thus, at this instance, the large force of inertia of the liquid 14a is applied to the diaphragm member 13 in the direction of D, so that the flexible diaphragm member 13 will be deformed or, more precisely, warped outwardly.

When the accelerating force applied to the member 12 is below a predetermined level, the diaphragm member 13 will maintain its normal shape not only with its own rigidity but also with the opposite external force of the atmospheric pressure surrounding it until it is deformed. When, however, the accelerating force exceeds the predetermined level, the diaphragm member 13 is warped with the formation of a vacuum cavity 14b, as shown in FIG. 1B. At this particular instant, the electric current, which has continued flowing between the two electrodes 15 and 16, is interrupted indicating that the vehicle has been decelerated heavily.

Figure 2:
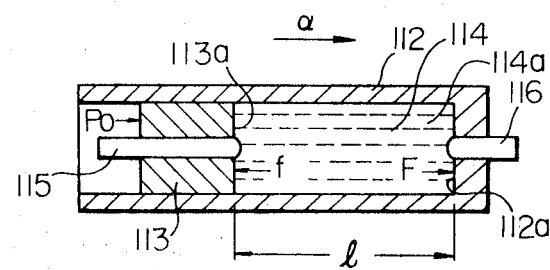
FIG. 2 is an explanatory view of a simplified model of the deceleration sensor of FIGS. 1A, 1B and 1C.

The critical parameters governing the predetermined level of the accelerating force at which the cavity 14b is formed will now be examined by simulating the cavitation deceleration sensor 10 with such a simplified "cylinder and piston model" such as used frequently in the practice. With reference to FIG. 2, the simplified model includes a cylindrical housing member 112 having an open and closed ends. A cylindrical piston member 113 (corresponding to the diaphragm member 13 of the embodiment) is hermetically and axially slidably received by the housing member 112 at the open end side of the housing member 112. The housing member 112 and piston member 113 define a chamber 114 which is filled with an electrically conductive liquid 114a. Two electrodes 115 and 116 are mounted respectively on the piston member 113 and housing member 112, for the purpose of simulation.

In connection with this model, some assumptions are to be made with the recitation of several nomenclatures:

M; Mass (Kg sec²/cm) of the piston member 113 which is assumed to have no friction with the housing member 112, α; Acceleration (cm/sec²) of the housing member 112 immediately after it starts to move in the direction of an arrow α from its original stationary position, A; Internal sectional area (cm²) of the housing member 112, ρ; Specific gravity (kg/cm²) of the electrically conductive liquid 114a which is assumed to have no viscosity, and $P_o$; Surrounding pressure (kg/cm²) acting on the outer surface of the piston member 113, p; Pressure (kg/cm²) of saturated vapor of the liquid 114a, l; Axial length (cm) of the liquid 114a.

For simplicity of discussion, a further assumption is made that the mass of the electrode 115 is negligible. With all these assumptions in mind, before a cavity is formed in the liquid 114a; an external force f applied to a unit area of the surface 113a is expressed in the gravitational system of units, as follows;

$$f = (P_o - (M/A) \alpha) \text{ kg/cm}^2 \tag{1}$$

Similarly, another external force F applied to the surface 112a is expressed considering the balance of forces;

$$F = (f - \rho l \alpha) \text{ kg/cm}^2 = (P_o - (M/A) \alpha - \rho l \alpha) \text{ kg/cm}^2 \tag{2}$$

From a hydrostatic theory, a liquid cannot continue its phase when it is exposed to a pressure under its saturated vapor pressure. Once a cavity is to be produced in a liquid, therefore, it appears in such a critical region of the liquid as having a lowest pressure level. The cavity in the "cylinder and piston model" of FIG. 2 will, accordingly, be formed in the vicinity of the inner surface 112a and the cavitation condition is dictated by the following expression:

$$F = (P_o - (M/A) \alpha - \rho l \alpha) \text{ kg/cm}^2 \leq p \tag{3}$$

From the above equation (3), it is concluded that a critical predetermined level $\alpha_{th}$ of the acceleration $\alpha$ can be determined beforehand by the sectional area A, the mass M, the length l and the specific gravity $\rho$.

The characteristics of the acceleration $\alpha$ will now be discussed with reference to FIG. 3, in which the acceleration $\alpha$ is plotted as an acceleration curve I against time t. Here, the vehicle is assumed to be subjected to a deceleration at time $t_0$. The acceleration curve I is shown during a time period $t_1$ to be above the threshold value $\alpha_{th}$. As has been pointed out, the embodiment of FIGS. 1A, 1B and 1C is provided with the two electrodes 15 and 16 protruding slightly into the chamber 14, so that the electric current flowing therebetween is interrupted immediately after the electrically conducting liquid 14a is moved relative to the housing member 12 when the acceleration $\alpha$ exceeds the threshold value $\alpha_{th}$.

Figure 4:
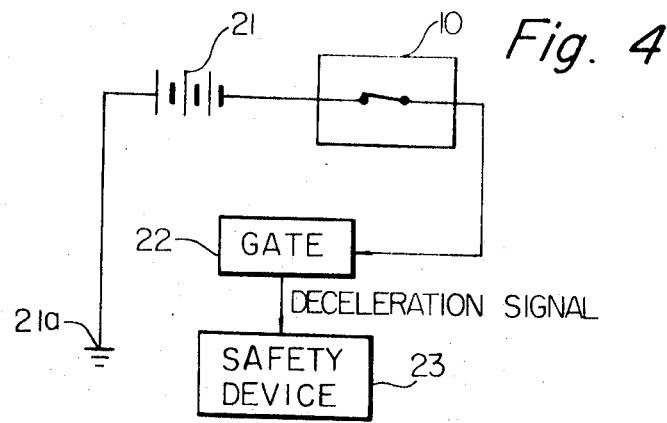
FIG. 4 is an electric connection showing a deceleration detecting device using the deceleration sensor of FIGS. 1A, 1B and 1C.

Referring further to FIG. 4, the overall system of the vehicular deceleration detecting device of the invention includes the cavitation deceleration sensor 10 which is now shown as a simplified normally closed switch. The device further includes an electric circuit for applying an electric potential between the two electrodes 15 and 16 of the deceleration sensor 10 so as to cause an electric current to flow therebetween. The electric circuit is provided, as is customary, with an energy source or battery 21 which may be grounded at 21a, as shown. The two electrodes 15 and 16 are electrically connected with a gate circuit 22 in which detection of interruption of the electric current is performed to produce a deceleration signal indicating that the vehicle is heavily decelerated. This deceleration signal is supplied to, for example, a safety device 23. This safety device 23 may be of any type if it can protect the vehicle occupant when the heavy deceleration is experienced in the vehicle. In other words, the vehicular deceleration detecting device according to the invention can be combined with any vehicular safety device and can act as a deceleration signal source for electrically triggering the safety device.

Figure 5:
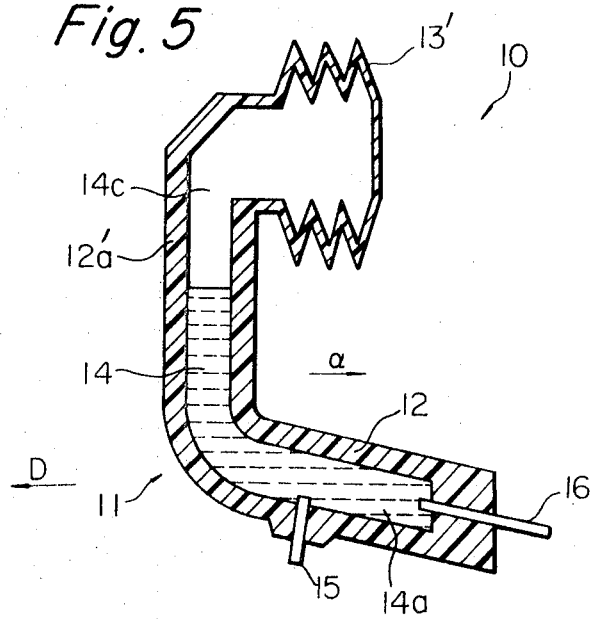
FIG. 5 is a sectional view showing another embodiment belonging to the group including that of FIGS. 1A, 1B and 1C.

Reference is now to be made to FIG. 5 showing another embodiment of the cavitation deceleration sensor 10 of the invention. It should be recognized hereinafter that like letters and numerals will designate like elements and indications in any of the following Figures. In this embodiment, the cylindrical member 12 has a normally horizontal portion and a normally vertical portion forming a general "capital letter L". The electrically conductive liquid 14a is normally filling the horizontal portion and occupying the lower part of the vertical portion, while an atmospheric air 14c is occupying the remaining upper portion of the vertical portion. The upper extending end 12'a is made integral with a means defining a deformable interface including bellows member 13'. The first electrode 15 is, in this instance, mounted on the member 12 in the midway thereof but is normally in electric contact with the liquid 14a. The advancing direction of the vehicle and the acceleration direction of the housing member 12 are similar to the former embodiment and, accordingly, are shown respectively by the arrows D and $\alpha$.

The operation of this embodiment is similar to that of the former embodiment so that detailed explanation thereof will be omitted. However, this embodiment is advantageous in that it can also detect overturn of the vehicle because the liquid 14a can flow down to interrupt the electric current when the vehicle is turned upside-down. It is quite conceivable here that the bellows member 13' can be replaced by the diaphragm member 13 as in the former embodiment.

Another group of embodiments will now be described with regard to FIGS. 6 to 10, in which the surrounding pressure can be preset at a suitable level.

Figure 6:
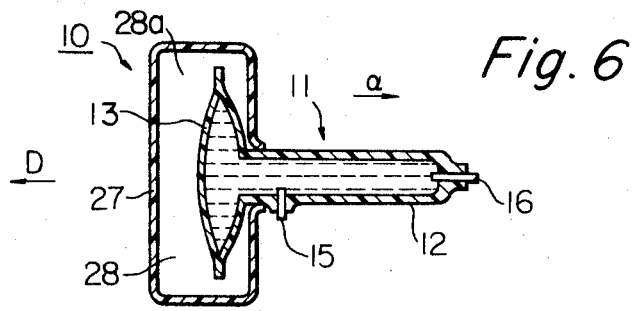
FIG. 6 is a sectional view showing an embodiment of the deceleration sensor falling in a second group.

Referring first to FIG. 6, the cavitation deceleration sensor 10 of the invention has a similar construction to the first embodiment of FIGS. 1A to 1C, as shown, except that it further includes an outer housing 27 defining an outer chamber 28 which surrounds the diaphragm member 13. The outer chamber 28 is filled with suitable gases 28a which may preferably have a reduced lower than atmospheric pressure. These gases 28a, which may be, for example, air or other inert gases, have a property of compressibility to resist upon the force of inertia of the conductive liquid 14a when the diaphragm member 13 is warped outwardly.

Figure 7:
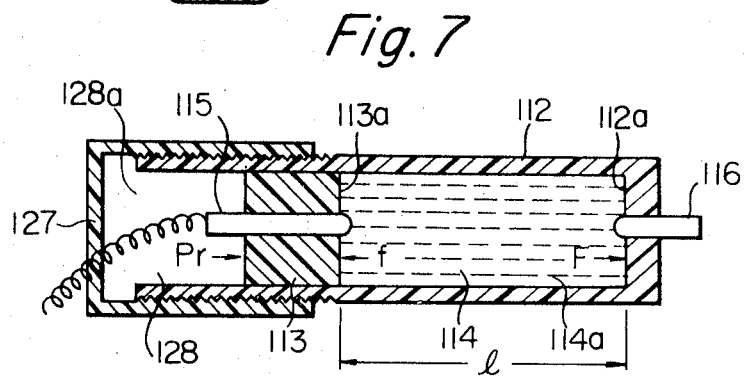
FIG. 7 is similar to FIG. 2 but explains another simplified mode of FIG. 6.

The operation of the sensor of FIG. 6 is slightly different in that the surrounding pressure $P_o$ in the equation (3) is replaced by a reduced pressure $P_r$ as shown in FIG. 7, which also illustrates the simplified "cylinder and piston model." With use of this model, the operational difference of this sensor 10 will now be explained. In FIG. 7, the open end of the housing member 113 is closed by an outer housing member 127 hermetically threaded thereto, providing an outer chamber 128 which confines suitable gases 128a under a reduced pressure $P_r$. Hence, the critical condition in which a cavity is formed is expressed from the equation (3) in terms of the critical acceleration $\alpha_{th}$ as follows:

$$\alpha_{th} = (P_r - p)A/M + Al \rho \tag{4}$$

,where $P_r <$ an atmospheric pressure ($P_o$)  (4)'

In connection with these equations (4) and (4)', evaluation of the liquid length l is frequently required from the practical considerations. With the assumptions ($M = p = 0$), the liquid length $l$ for mercury can be calculated and its representative value is, for example, about 76 cm, if the pressure $P_r$ is assumed to have a value of 1 kg/cm² (i. e. of the atmospheric pressure) and if the threshold value $\alpha_{th}$ of the acceleration is preset at one gravitational acceleration. The evaluated value of 76 cm is too large for an automotive vehicle and, therefore, does not appear practical. If, on the other hand, the value of pressure $P_r$ is assumed as one tenth of the atmospheric pressure (i. e. 0.1 kg/cm²), then the value of liquid length $l$ is calculated to be about 7.6 cm. This value of 7.6 cm can be said an acceptable value from the practical standpoint.

Figure 3:
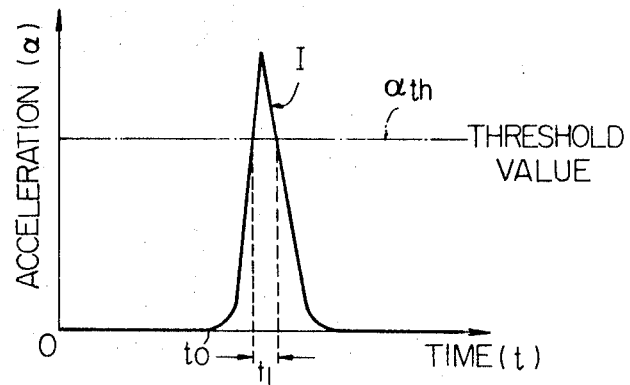
FIG. 3 is an explanatory view of characteristics of the acceleration experienced in the deceleration sensor of FIGS. 1A, 1B and 1C when a vehicle is decelerated.
Figure 8:
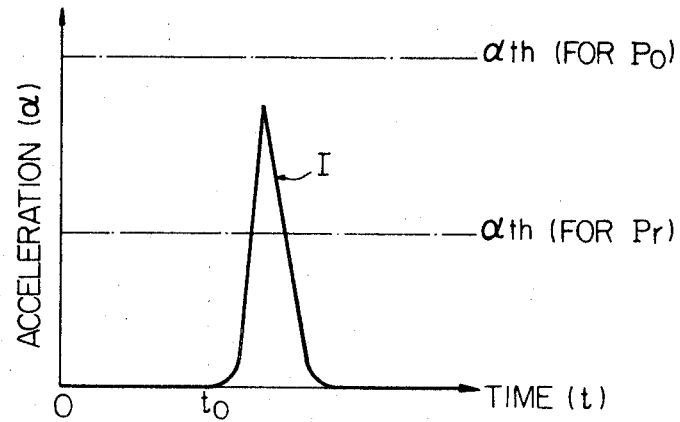
FIG. 8 is similar to FIG. 3 but explains the characteristics of the embodiment of FIG. 6.

These discussions can be made more illustrative with reference to FIG. 8, which is similar to FIG. 3 plotting the acceleration $\alpha$ of the housing member 12 in terms of time $t$. In FIG. 8, the curve I is transferred from that of FIG. 3. As apparent from the equation (4), the threshold value $\alpha_{th}$ of the acceleration $\alpha$ is inversely proportional to the liquid length $l$. This means that there may exist two threshold values $\alpha_{th}$ (for $P_o$) and $\alpha_{th}$ (for $P_r$) in FIG. 8 for the different liquid lengths as above. With these characteristics in mind, therefore, the cavitation deceleration sensor 10 of FIG. 6 can set a lower threshold value $\alpha_{th}$ (for $P_r$) by reducing the value of $P_r$, so that it can detect a lower deceleration of the vehicle than those embodiments of FIGS. 1A, 1B, 1C and 5, if all other conditions including the same liquid length $l$ are common.

Figure 9:
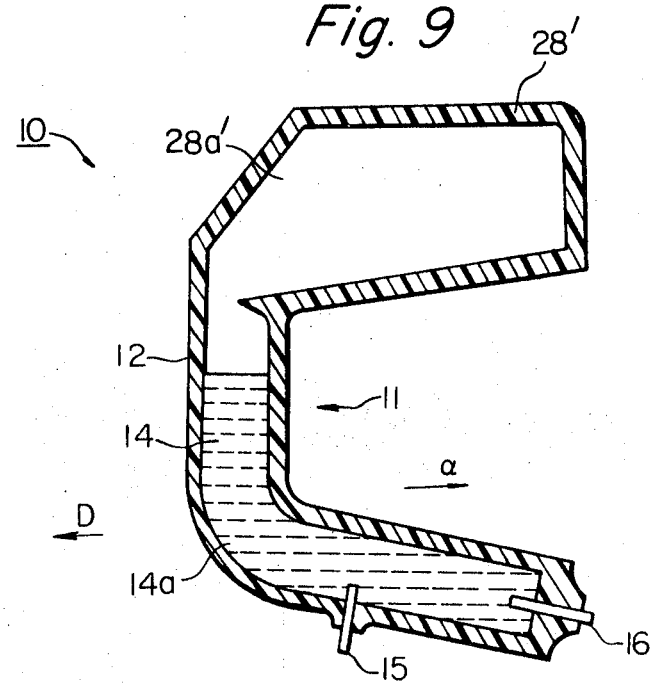
FIG. 9 is a sectional view showing another embodiment belonging to the second group including that of FIG. 6.

Another embodiment falling in this group is shown in FIG. 9, in which the general shape is similar to that of FIG. 5 but no bellows member is used. The upper extending end 28' is rigid and is formed integral with the member 12. In other words, the extending end 28' corresponds to and has a similar function to the outer housing 28 of FIG. 6. Within this outer housing member 28', suitable gases 28'a are similarly confined at the reduced pressure $P_r$.

The operation of this embodiment can be easily understood from that of FIG. 6 in combination with that of FIG. 5 so that detailed explanation will be unnecessary. In this embodiment, no means such as the diaphragm or bellows member is employed, but the means defining a deformable interface comprises the compressibility of the confined gases 28'a which will perform a similar function to resist the force of inertia of the conductive liquid 14a.

Figure 10:
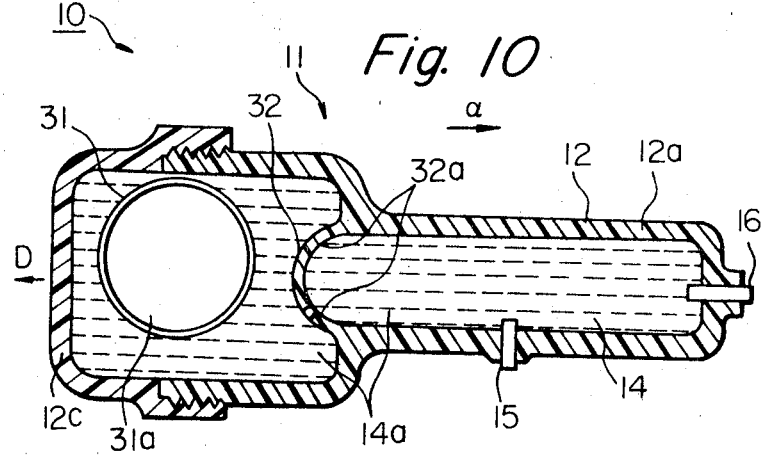
FIG. 10 is similar to FIG. 9 but shows a further embodiment belonging to the second group including those of FIGS. 6 and 9.

A further embodiment belonging to this group including those of FIGS. 6 and 9 will now be explained referring to FIG. 10, in which the container 11 further includes means defining a deformable interface including a capsule or an inner housing member 31. This housing member 31 is made of a flexible and electrically insulating material and is filled with suitable gases 31a under a reduced pressure $P_r$. The cylindrical housing member 12 defines the chamber 14 together with a cap member 12c which may be hermetically threaded to the housing member 12. The inner housing member 31 may be a balloon of a suitable size and is positioned in the chamber 14 which is filled with the electrically conductive liquid 14a. For protection of the balloon 31 from going into the cylindrical portion 12a of the housing member 12, a partition 32 may be provided between the balloon 31 and the electrodes 15 and 16. In this instance, the partition 32 should be provided with several holes 32a for allowing fluid communication therethrough.

The operation of this embodiment is self-explanatory from the above discussion. However, it should be appreciated as an important advantage of this embodiment that the confined gases 31a are isolated from both the housing member 12 and the liquid 14a. As a result, undesirable chemical reactions are avoidable between the gases 31a and the housing member 12 or the liquid 14a.

A still further group of embodiments will now be disclosed in conjunction with FIGS. 11A, 11B and 11C to 16. The cavitation deceleration sensor 10 falling in this group has such a dominant feature as the interruption of the electric current flowing between the two electrodes is controlled not only by the absolute level of the acceleration experienced in the housing member 12 but also by the development of the length of the cavity formed.

Figure 11A:
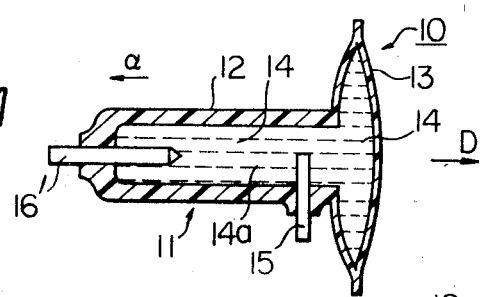
FIG. 11A is an axial sectional view showing an embodiment of the deceleration sensor falling in a third group.
Figure 11B:
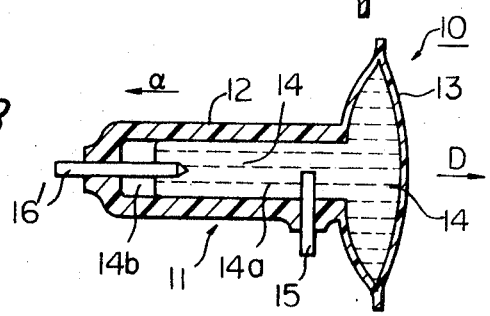
FIG. 11B is similar to FIG. 11A but shows the situation at which a cavity is formed in operation.
Figure 11C:
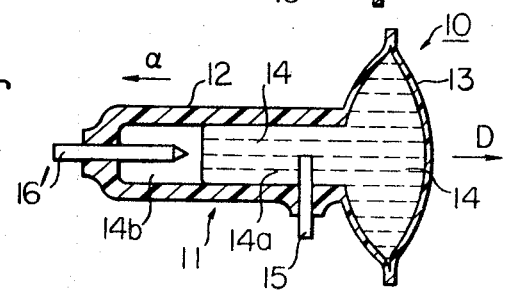
FIG. 11C is similar to FIG. 11B but shows the situation at which the cavity is developed from that 11B FIG. 11B.

More detailed discussion will be made with reference to FIGS. 11A, 11B and 11C, in which the construction of the deceleration sensor 10 is similar to that of FIGS. 1A, 1B and 1C except that an electrode 16' corresponding to the electrode 16 of FIGS. 1A, 1B and 1C protrudes considerably into the chamber 14 to have a larger axial length of electric contact with the electrically conductive liquid 14a.

Figure 12:
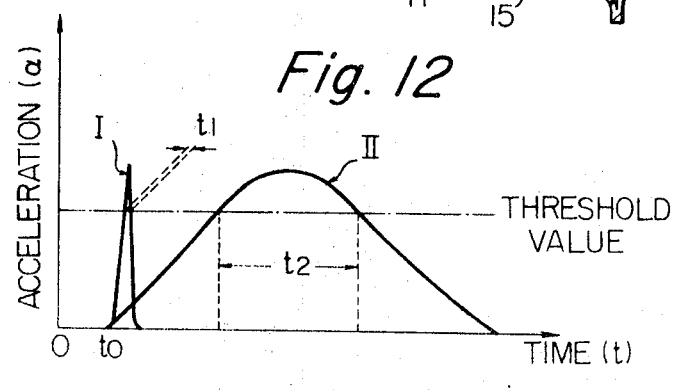
FIG. 12 is similar to FIG. 3 but the acceleration is experienced in the deceleration sensor of FIGS. 11A, 11B and 11C.

Thus, as shown in FIG. 12, a resultant acceleration curve I obtained from this embodiment should have a shorter time duration $t_1$ in comparison with $t_1$ of the former curve II, which has been transferred from FIG. 3 or 8.

Figure 13:
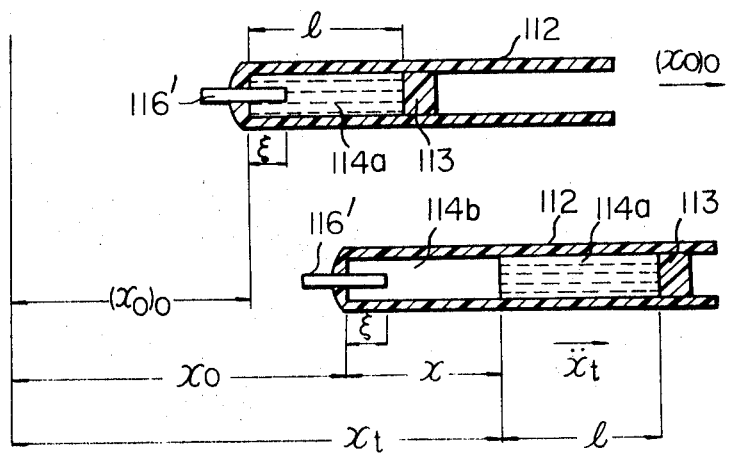
FIG. 13 is similar to FIGS. 2 and 7 but shows another simplified model of FIGS. 11A, 11B and 11C.

With the aid of the simplified "cylinder and piston model" as shown in FIG. 13, the meaning of the above shorter time duration will be discussed. In FIG. 13, the electrode 116' has a considerably protrusion length $\xi$ and here is assumed to have a diameter of 0 cm. As shown in the above half of FIG. 13, the cylindrical housing member 112 is moving at a constant speed $(\alpha_0)_0$ cm/sec together with all other members 113, 114a and 116'. At this particular instance, the housing member 112 is decelerated suddenly within an infinitesimal time period. This implies that the housing member 112 is decelerated by a deceleration rate of infinity at time $t_0$ at a point $(\alpha_0)_0$ taken on a stationary system of coordinates, for example, on an origion 0 of the surface of the earth. Then, a cavity 114b is instantly formed as shown in the lower half of FIG. 13.

After an elapse of time $t$ from the instant when the cavity 114b is formed, the housing member 112 has been moved by an absolute length $\{x_0 - (x_0)_0\}$ cm, the length of cavity 114b has grown up to $x$ cm, and the cavity 114b has been displaced by an absolute length $\{x_t - (x_0)_0\}$ cm. As to the liquid length $l$, it is actually variable as understandable from FIGS. 11A, 11B and 11C due to warp of the diaphragm member 13, but is assumed to have a constant value $l$ for simplicity of discussion. Here, in addition to the previous assumptions made in connection with FIGS. 2 and 7 several assumptions will be made. That is, the pressure $p$ of the saturated vapor of the liquid 114a is assumed to be negligible and the mass M of the piston member 13 is also assumed to be negligible.

Then, the acceleration $\ddot{x}_t$ of displacement of the formed cavity 114b with respect to the surface of the earth will be derived similarly to the derivation of the equation (3), as follows:

$$(A l \rho) \ddot{x}_t = -(1-0)A \tag{5}$$

Hence, $$\ddot{x}_t = -(1/\rho\ l) \tag{6}$$

Therefore, the resultant displacement of the cavity $114b$ is formulated by substituting the boundary conditions, as follows:

$$x_t = -(1/2\ \rho\ l)t^2 + (\dot{x}_0)_0 t + (x_0)_0 \tag{7}$$

Figure 14A:
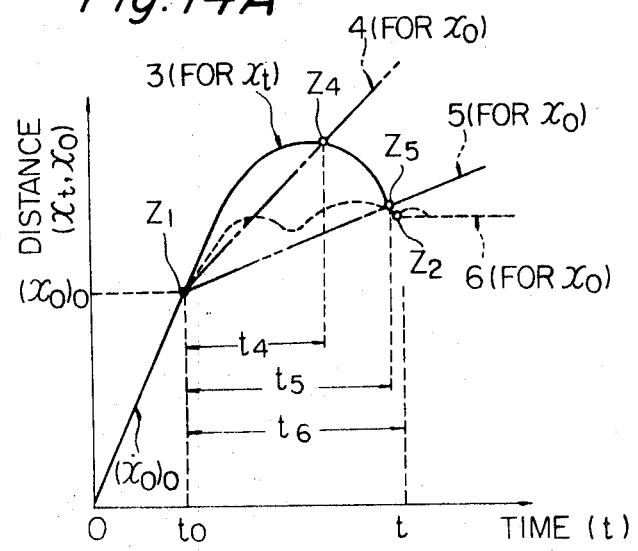
FIG. 14A is an explanatory view showing movement characteristics of the container of the deceleration sensor and of the confined conductive liquid both of the simplified model of FIG. 13.

The final equation (7) is expressed as a quadratic function of the cavity displacement $x_t$ in terms of time $t$ and, accordingly, is illustrated in FIG. 14A as a curve 3 from a point $Z_1$ to another point $Z_2$.

After the cavity $114b$ has been formed, on the other hand, the movement of the housing member 112 never affects the motion of the liquid $114a$ until the cavity $114b$ disappears. This because during existence of the cavity $114b$ the both ends of the liquid $114a$ are always exposed respectively to the surrounding pressure of 1.0 kg/cm$^2$ and to the pressure of saturated vapor of 0 kg/cm$^2$ according to the assumptions. Therefore, the development of the cavity displacement $x_t$ is determined only by the movement of the vehicle at the particular collision point $Z_1$.

As is well known in the art, there are several types of collision in accordance with the deceleration experienced in the vehicle. Here, three representative types of collision will be discussed with reference to FIGS. 14A and 14B.

Before the occurrence of collision, the housing member 112 is running at the constant speed $(\dot{x}_0)_0$ and experiences a sudden deceleration at the collision point $Z_1$, namely at a point $(x_0)_0$ and at a time $t_0$, as shown in FIG. 14a. From other curves 4 and 5 indicating the displacements of the housing member 112, the housing member 112 has an acceleration rate of infinity at the collision point $Z_1$. This is understandable because each of the two curves 4 and 5 have a singularity (in terms of velocity) at the collision point $Z_1$. At this instance $t_0$, therefore, the deceleration sensor 10 is under a condition for forming the cavity $114b$ therein. The only difference between the two curves 4 and 5 is that the momentum variation of the curve 5 due to the collision has a larger value than that of the curve 4. This is easily understandable by considering the angular deviations of the curves 4 and 5 from the initial slope $(\dot{x}_0)_0$. On the other hand, the two curves 4 and 5 are shown to intersect the cavity displacement curve 3 respectively at points $Z_4$ and $Z_5$. The cavity growth length $x$ is expressed by the equation $(x = x_t - x_0)$ with reference to FIG. 13, so that the two points $Z_4$ and $Z_5$ correspond to the points at which the cavity $114b$ disappears respectively after occurrence of the two collisions dictated by the housing member's displacement curves 4 and 5. This is because the condition for disappearance of the cavity $114b$ is $x = 0$. Therefore, the liquid $114a$ in the case of the curve 4 can move relative to the housing member 112 for a duration time $t_4$ while in the case of the curve 5 for a duration time $t_5$, as shown.

Figure 14B:
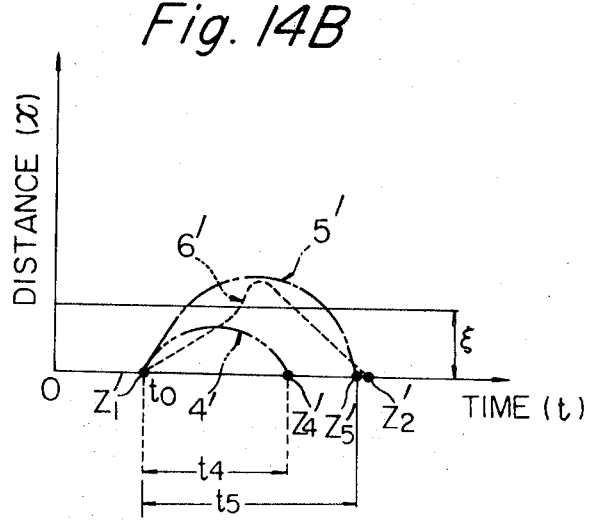
FIG. 14B is an explanatory view showing a cavity growth length derived from FIG. 14A.
Figure 15:
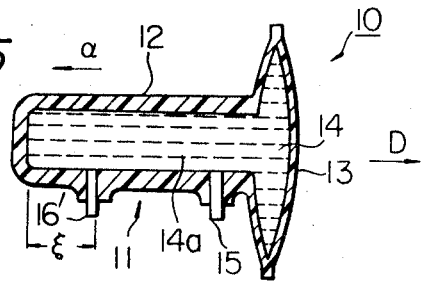
FIG. 15 is a sectional view showing another embodiment of the deceleration sensor belonging to the third group including that of FIGS. 11A, 11B and 11C.

Reference is now to be made to FIG. 14b, in which the cavity growth length $x$ is plotted against time $t$ by deriving it from FIG. 14A according to the equation $(x = x_t - x_0)$. In FIG. 14B, the cavity growth length curve $5'$ corresponding to the curve 5 of FIG. 14A will be found always above the other cavity growth length curve $4'$ corresponding to the curve 4 of FIG. 14A. This means that the maximum value of the cavity growth length $x$ is substantially proportionate to the momentum variation, or more specifically, substantially proportional to the square of the displacement velocity $(\dot{x}_0)$ of the housing member 12, between before and after the collision experienced. With this behavior of cavity growth length $x$ in mind, the interruption of the electric current between the two electrodes can be controlled by selecting a suitable protrusion length of the electrode $116'$. More specifically, for example, the curve $5'$ can be above selected value but the curve $4'$ remains a below the particular value. Although an explanation has been devoted hereinbefore to the simplified model that the cavity displacement $x_t$ is expressed as a quadratic equation, it will be conceivable that the embodiment of FIGS. 11A, 11B and 11C can detect a variety of modes of the vehicular deceleration with use of the electrode $16'$ having a selected protrusion length $\xi$.

Referring to FIGS. 14A and 14B, a more possible mode of the deceleration is shown respectively as a cavity displacement curve 6 and a cavity growth length curve $6'$. From the illustration of FIG. 14B, it will be easily understood that the vehicle deceleration corresponding to the curve $6'$ is detected by the deceleration sensor of FIGS. 11A, 11B and 11C, since the curve $6'$ can locally exceed the protrusion length $\xi$. It should be touched here that those points $Z_1'$, $Z_2'$, $Z_4'$ and $Z_5'$ as shown in FIG. 14B respectively correspond to those points $Z_1$, $Z_2$, $Z_4$ and $Z_5$ of FIG. 14A.

Figure 16:
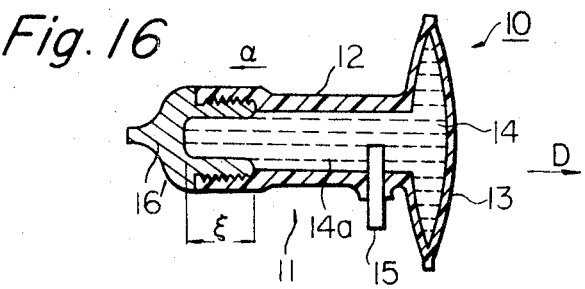
FIG. 16 is similar to FIG. 15 but shows a further embodiment belonging to the third group.

As to other examples falling in this category it might be sufficient to mention that effective tips of the electrode $16'$ concerning the current conduction are spaced from the end wall by a predetermined distance $\xi$. The cavitation sensor 10 of FIG. 15, for example, includes the electrode $16'$ mounted on the side wall of the member 12 at the predetermined distance from its end wall. In FIG. 16, on the other hand, the electrode $16'$ is a threaded cap having a protrusion length of $\xi$.

It should be appreciated that these embodiments of FIGS. 11A, 11B and 11C to 16 can adopt the concept of the former group represented by the embodiment of FIG. 6, without departing from this concept having an electrode of a considerable protrusion length. In other words, the deceleration sensor of those embodiments can be provided with the outer housing member 28 or other similar member so as to reduce the surrounding pressure.

Figure 17A:
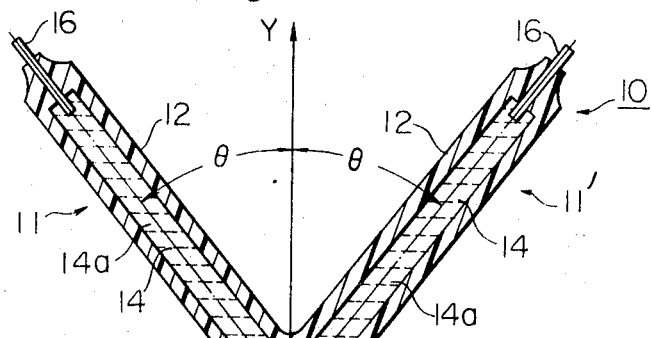
FIG. 17A is an axial sectional view showing an embodiment of the deceleration sensor falling in a fourth group.
Figure 17B:
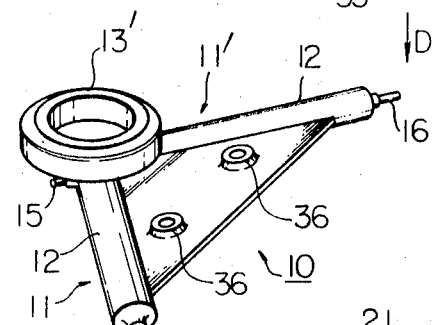
FIG. 17B is a perspective view showing the embodiment of FIG. 17A.
Figure 17C:
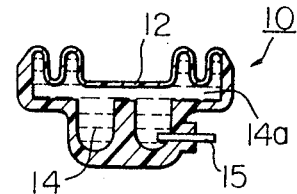
FIG. 17C is a radial section taken on line 17C—17C of FIG. 17A.

Other embodiments belonging to a still another group will be discussed with reference to FIGS. 17A, 17B and 17C to 21, in which a plurality of container units are included in the cavitation deceleration sensor 10 of the invention, with a means defining a deformable interface including bellows member $13'$ and first electrode 15 being common to all the containers. In FIGS. 17A, 17B and 17C, the deceleration sensor 10 includes two containers 11 and $11'$ having the same diameter and length and arranged to form a capital letter V by a suitable angle $2\theta$, as shown. The conductive liquid $14a$ confined in the two cylindrical members 12 communicates with each other through ports 35 and 35' which lead to a common bellows member 13'. As has been discussed, an electric potential is applied between the common first electrodes 15 and the two second electrode 16. The thus constructed deceleration sensor 10 is fastened as a whole to the vehicular construction body (not shown) by a suitable mounting plate 36. For the later discussion, two ordinates X, Y are arranged so that the axis of ordinate Y lies in the opposite direction to the vehicle advancing direction D, and in which the axis of abscissa X is perpendicular to the axis Y.

Figure 18:
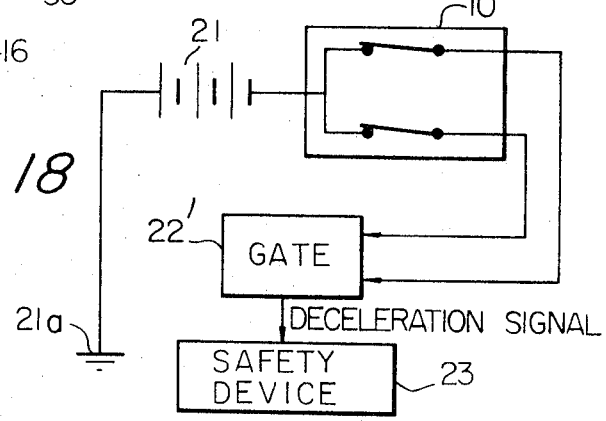
FIG. 18 is an electric circuit diagram showing a deceleration detecting device using the deceleration sensor of FIGS. 17A, 17B and 17C.

Referring now to FIG. 18, the deceleration sensor 10 of this embodiment is electrically connected to gate means 22'. In accordance with operation of this means 22', direction characteristics of the deceleration sensor 10 can be varied, as will be discussed in FIG. 19.

Figure 19:
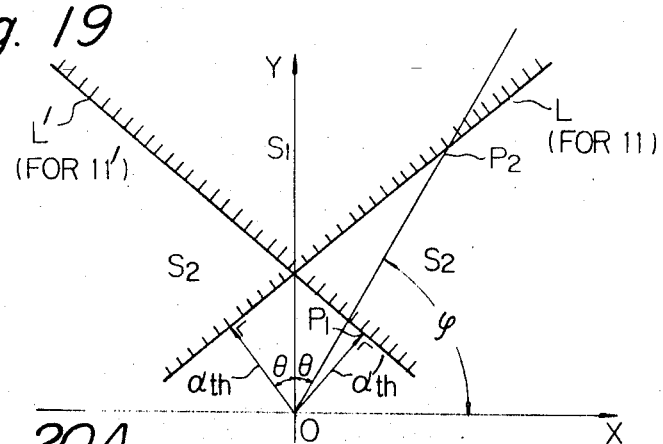
FIG. 19 is an explanatory view showing operation region of the deceleration sensor of FIGS. 17A, 17B and 17C.

In FIG. 19, the threshold values $\alpha_{th}$ and $\alpha'_{th}$ of the acceleration of the member 12 are shown in a vector form. The values $\alpha_{th}$ and $\alpha'_{th}$ may be different but have an absolute value in this embodiment. The operation region (or "Switch-off" region) of the container 11 is found to exist above a characteristic line L which is perpendicular to the vector $\alpha_{th}$. On the other hand, the operation region of the container 11' is shown above another characteristic line L' which is perpendicular to the vector $\alpha'_{th}$. If, in this instance, the gate means 22' of FIG. 18 is of the so-called AND type, the operation region of the deceleration sensor 10 shown in FIGS. 17A, 17B and 17C is a region $S_1$ defined by and above the lines L and L', as shown in FIG. 19. If, however, the gate means 22' is of OR type, the operation region of the sensor 10 is a region including $S_1$ and $S_2$. In this way, direction characteristics of the sensor 10 of this embodiment can be controlled either wide or narrow by suitably selecting the type and combination of the gate means 22'.

For illustrative purposes, the gate means 22' is assumed to be of AND type. In this instance, if an acceleration having an angle $\phi$ with respect to the axis X is experienced in the particular vehicle, as shown in FIG. 19, then no interruption of the electric current takes place in the two containers 11 and 11' until the acceleration in the form of vector exceeds an intersection point $P_1$ with the line L'. From this intersection point $P_1$ to another intersection point $P_2$ with the line L, interruption of the electric current is effected only in the container 11'. Once, however, the acceleration exceeds the intersection point $P_2$, the electric interruption occurs in the two containers 11 and 11' so that the vehicular deceleration device produces a deceleration signal, as shown in FIG. 18.

Figure 20A:
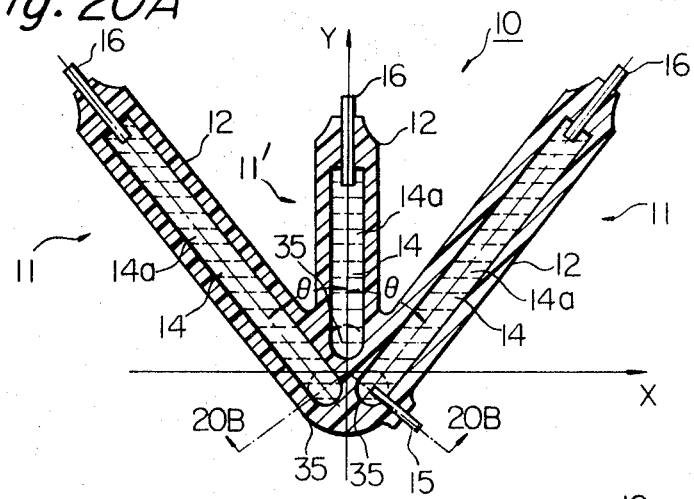
FIG. 20A is similar to FIG. 17A but shows another embodiment belonging to the fourth group including that of FIGS. 17A, 17B and 17C.
Figure 20B:
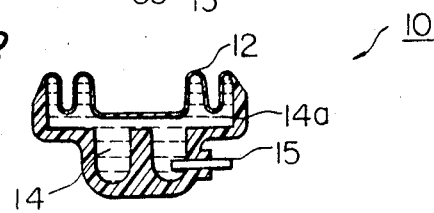
FIG. 20B is a radial section taken on line 20B—20B of FIG. 20A.
Figure 21:
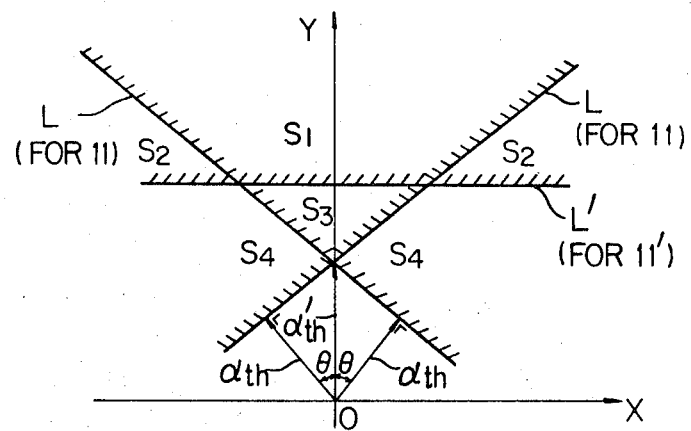
FIG. 21 is similar to FIG. 19 but shows operation region of the deceleration sensor of FIGS. 20A and 20B.

Another embodiment of this group will now be explained with reference to FIGS. 20A, 20B and 21. The cavitation deceleration sensor 10 is of such construction as having an intermediate cylindrical member 11' in addition to the construction of the former embodiment of FIGS. 17A, 17B and 17C. The additional intermediate container includes a shorter housing member 12 communicating with the bellows member (not shown) by way of a port 35. The characteristic line L' for this member 11' is shown in FIG. 21 to be relatively at a higher side. This is because the threshold value $\alpha'_{th}$ of the acceleration for this container 11' is relatively large from the evaluation of the equation (4) by substituting a smaller length $l$ thereto.

The electric connection of the second electrode 16 is performed by adding in parallel as a simplified normally closed switch to the two switches shown in FIG. 18. Therefore, illustrative presentation of this connection will be omitted.

If the gate means 22' is of OR type, the operation region of the deceleration sensor 10 is shown in FIG. 21 to include the regions $S_1$, $S_2$, $S_3$ and $S_4$. If, on the other hand, the gate means 22' is of AND type, the resultant operation region includes only the region $S_1$, as easily understood from the previous discussion made in connection with FIG. 19.

Figure 22:
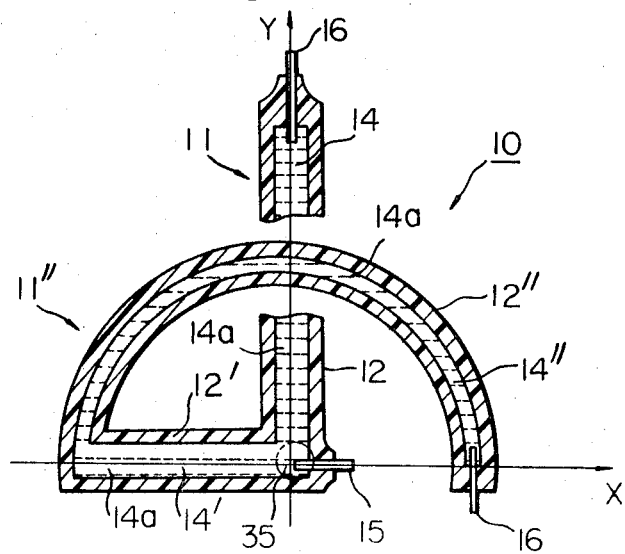
FIG. 22 is a sectional view showing an embodiment of the deceleration sensor falling in a fifth group.

A further group of embodiments having improved unique direction characteristics will now be explained with reference to FIGS. 22 to 30. In FIG. 22, the container of the cavitation deceleration sensor 10 is composed of two tubular housing members 11 and 11'', the former being similar to one of the containers of FIG. 17A while the latter generally having a semi-circular form. These two members 11 and 11' have fluid communication through the port 35 with each other.

Figure 23:
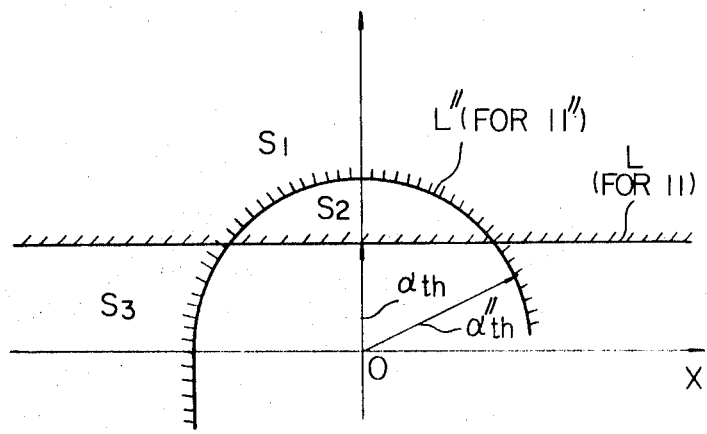
FIG. 23 is similar to FIG. 19 but shows operation region of the deceleration sensor of FIG. 22.

The electric connection of this embodiment is just the same as that of FIG. 18. Although detailed discussion is omitted, the obtained characteristic lines L and L' respectively for the containers 11 and 11' are shown in FIG. 23. With the gate means 22' of OR type, the deceleration sensor 10 of this embodiment can detect the acceleration within the region including $S_1$, $S_2$ and $S_3$. With the AND gate means, on the other hand, the operation region is limited only to the region $S_1$.

Figure 24A:
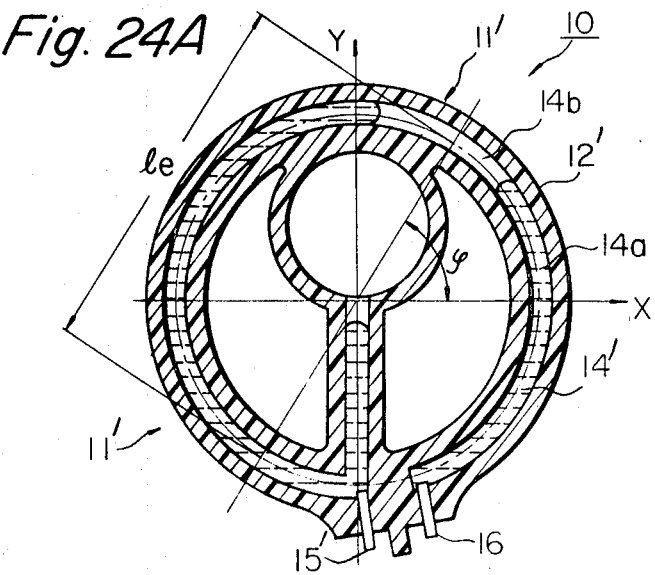
FIG. 24A is a sectional view showing another embodiment of the deceleration sensor belonging to the fifth group including that of FIG. 22.
Figure 24B:
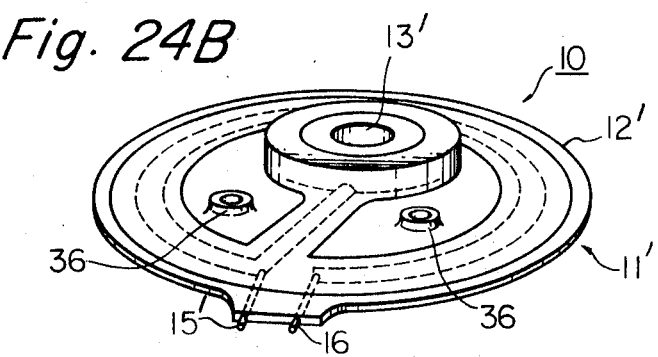
FIG. 24B is a perspective view showing the embodiment of FIG. 24A.

Another embodiment falling in this category is shown in FIGS. 24A and 24B. The cavitation deceleration sensor 10 includes a container 11' having a generally circular housing member 12'. The resisting means may be of any preceding type but is shown here to include the diaphragm member 13 made of a flexible and electrically insulating material. The two electrodes 15' and 16 are mounted on the housing member 12' in a remotest position from each other. The thus constructed deceleration sensor 10 is fastened to the vehicular construction body (not shown) by a suitable mounting plate 36, as shown in FIG. 24B. It will be easily understood that the effective value $l_e$ of the cavity length $l$ is the diameter of the housing member 12'.

Figure 25:
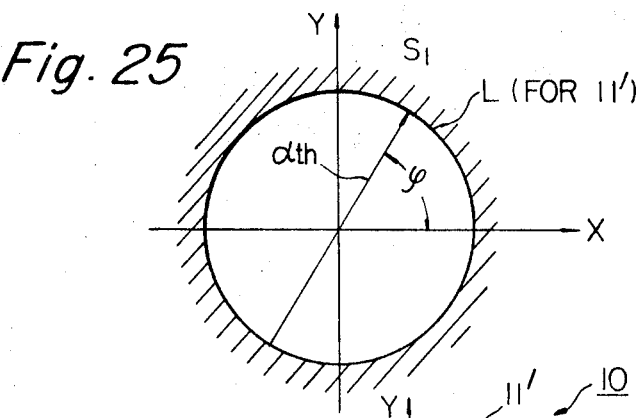
FIG. 25 is similar to FIG. 19 but shows operation region of the deceleration sensor of FIGS. 24A and 24B.

With the same electric connection as in FIG. 4, the deceleration sensor 10 has the operation region $S_1$ defined by the characteristic line L, as seen from FIG. 25. Since this operation region $S_1$ is spreaded below the axis X, the sensor 10 can detect not only deceleration of the vehicle but also acceleration thereof. This may be advantageous to protect the vehicle occupant when the vehicle is hit by another vehicle from behind.

Figure 26:
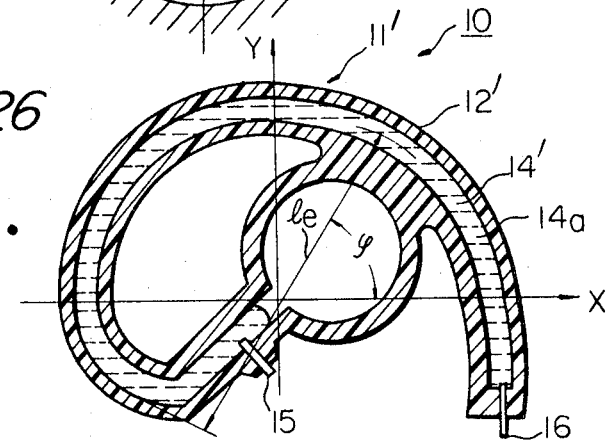
FIG. 26 is a sectional view showing a further embodiment of the deceleration sensor belonging to the fifth group.
Figure 27:
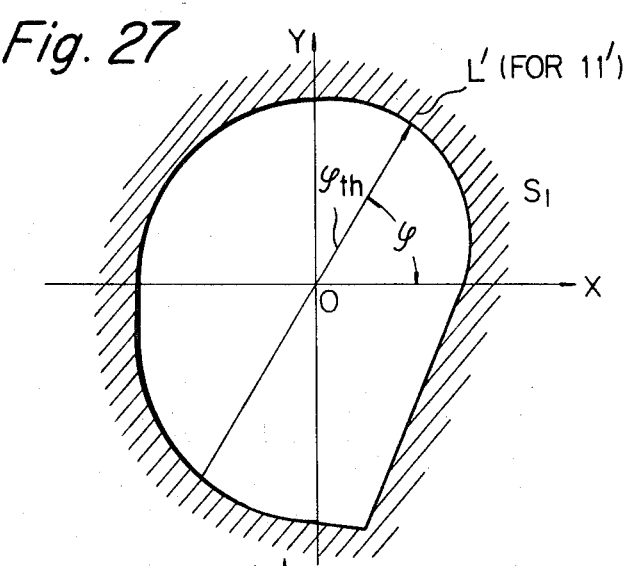
FIG. 27 is similar to FIG. 19 but shows operation region of the deceleration sensor of FIG. 26.

Reference is now to be made to FIGS. 26 and 27 showing another embodiment of the deceleration sensor 10. The housing member 12' of this embodiment has a substantially ellipse shape. However, the operation of the sensor 10 is similar to that of FIGS. 24A and 24B, so that it will be sufficient to show the resultant operation region $S_1$ in FIG. 27 without any explanation.

Figure 28:
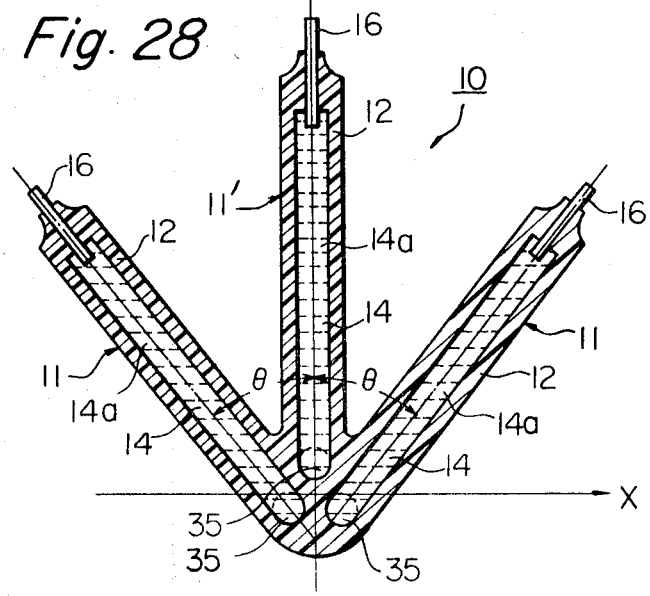
FIG. 28 is a sectional view showing a further embodiment of the deceleration sensor belonging to the fifth group.
Figure 29:
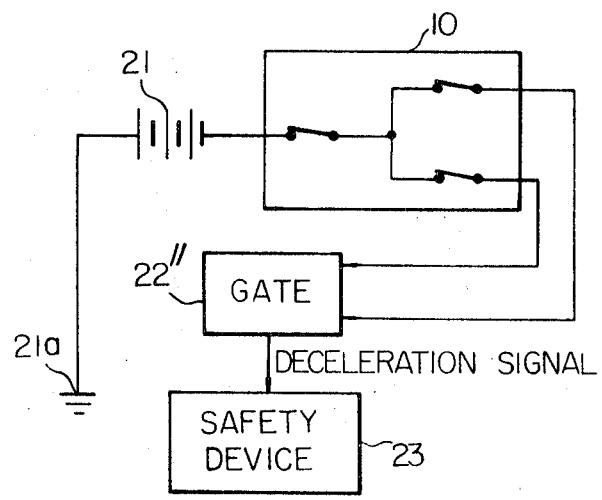
FIG. 29 is an electric circuit diagram showing a deceleration detecting device using the deceleration sensor of FIG. 28.
Figure 30:
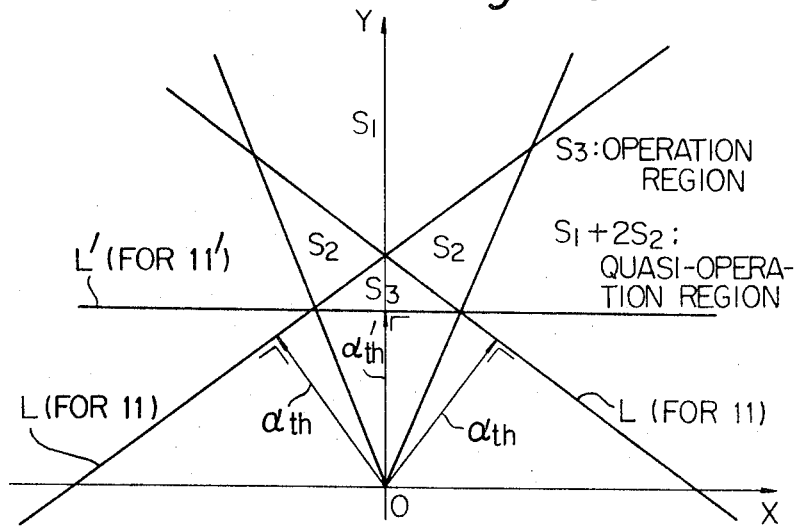
FIG. 30 is similar to FIG. 19 but shows operation region of the deceleration sensor of FIG. 28.

Still another embodiment belonging to this group will be described with reference to FIGS. 28 to 30. The overall construction of the deceleration sensor 10 of this embodiment is similar to that of FIGS. 20A and 20B except in the following two points. First, the first electrode 15 of FIGS. 20A and 20B are dispensed with and, accordingly, an electric potential is applied between any two of the three second electrodes 16. Second, the intermediate tubular member 11' has a larger length than the two inclined tubular member 11 in the direction of the axis Y.

With respect to a unit container, therefore, it is considered that the sensor 10 is made of three bent housing members having respectively two electrodes 16 mounted at the ends thereof. As a result, if the electric connection is made in a manner as shown in FIG. 29 with one switch connected in series with two parallel switches and if the gate means 22'' is suitably selected, a quasi-operation region can be obtained in addition to the normal operation region, as seen from FIG. 30.

As has been explained, the effective length of the intermediate container 11' is larger than the two containers 11, so that the characteristic line L' for the container 11' is below the intersection point of the two lines L for the container 11. Thus, by suitably combining AND and OR gate in the gate means 22'', the region $S_3$ is settled to be the normal operation region while the region $S_1$ and $S_2$ the quasi-operation region.

Although explanation of the application of the cavitation deceleration sensor of the invention has been hereinbefore limited to a vehicular deceleration device for use with a vehicular safety device, it should be appreciated that the deceleration sensor can be used for a general acceleration detector for any purpose.

What is claimed is:

1. A device for detecting deceleration of a vehicle comprising means defining a chamber mounted in use stationarily in a vehicle; an electrically conductive, non-compressible liquid in said chamber; said means defining said chamber comprising means defining a deformable interface with said liquid confining said liquid in said chamber and deformable upon the application of a force developed by said liquid upon deceleration of said vehicle in a direction for increasing a volume of said chamber containing said liquid developing a vacuum cavity in a portion of said liquid; a first electrode disposed extending into said chamber electrically contacting said liquid; at least a second electrode disposed extending into said chamber and spaced apart from said first electrode electrically contacting said liquid; said first electrode having means for receiving an electrical signal for passing through said liquid to said second electrode; said second electrode being positioned to be enveloped by said vacuum cavity when developed thereby interrupting said first electrical signal.

2. A device according to claim 1, wherein said means defining said chamber comprises an elongated, tubular member disposed axially in the direction of the change in acceleration of said vehicle, composed of rigid, electrically insulating material having an intermediate portion and opposite end portions in communication therewith, one end portion having a larger transverse dimension than the other end portion and said intermediate portion, said means defining said deformable interface comprising a diaphragm disposed at said one end portion in intimate contact with said liquid and composed of flexible, electrically insulating material, said diaphragm having a part thereof expansible in a direction outwardly of said chamber in response to the application of said force applied by said liquid upon deceleration of said vehicle.

3. A device according to claim 2, wherein said first electrode is mounted on said diaphragm for movement therewith and said second electrode is disposed extending into said other end portion.

4. A device according to claim 2, wherein said first electrode is disposed extending into said intermediate portion and said second electrode is disposed extending into said other end portion.

5. A device according to claim 2, wherein said first electrode is disposed extending into said intermediate portion and said second electrode is disposed extending into said intermediate portion and spaced at a greater distance from said one end portion than said first electrode.

6. A device according to claim 2, wherein said first electrode is disposed extending into said intermediate portion, and in which said second electrode comprises a threaded cap disposed defining said chamber in conjunction with said intermediate portion of said tubular member.

7. A device according to claim 2, including means containing a compressible fluid at less than atmospheric pressure enclosing said diaphragm for increasing the sensitivity of said diaphragm to said force applied by said liquid.

8. A device according to claim 1, wherein said means defining said chamber comprises an elongated tubular member composed of rigid, electrically insulating material disposed axially in the direction of the change in acceleration of said vehicle and having two communicating end portions, one end portion having a larger transverse dimension than the other end portion and said means defining said deformable interface comprising a capsule composed of flexible electrically insulating material immersed within said liquid and containing compressible fluid at leas than atmospheric pressure, said capsule being compressible in response to the application of said force applied by said liquid upon deceleration of said vehicle.

9. A device according to claim 8, wherein said means defining said chamber further comprises a partition disposed between said two end portions and having apertures for permitting communication between said two end portions, and said capsule being disposed in one of said two end portions.

10. A device according to claim 1, wherein said means defining said chamber comprises a tubular member composed of rigid, electrically insulating material having one portion filled with said liquid and another portion offset from and in communication with said one portion and above the level of said liquid, a fluid contained within said another portion, and said means defining said deformable interface comprises a bellows composed of flexible, electrically insulating material disposed at said another portion in contact with said fluid and having a part thereof expansible in a direction outwardly of said chamber in response to the application of said force applied by said liquid upon deceleration of said vehicle.

11. A device according to claim 1, wherein said means defining said chamber comprises a tubular member composed of rigid, electrically insulating material having a first portion filled with said liquid and a second portion in communication with and offset from said first portion and above the level of said liquid, a compressible fluid contained within said second portion and said means defining said deformable interface comprising the compressible fluid, and said fluid compressing upon the application of said force applied by said liquid upon deceleration of said vehicle.

12. A device according to claim 1, wherein said means defining a chamber comprises an elongated tubular member composed of rigid, electrically insulating, material having two communication portions having equal diameters and equal lengths, each portion having an end portion communicating therewith, said second electrode being disposed extending into the end portion of one of said two portions and a third electrode being disposed extending into the end portion of the other of said two portions, said means defining said deformable interface comprising a bellows composed of flexible, electrically insulating material disposed at a juncture of said two portions, and said bellows having a part thereof expansible outwardly of said chamber in response to the application of said force applied by said liquid upon deceleration of said vehicle.

13. A device according to claim 12, wherein said means defining a chamber further comprises a third portion of said tubular member equal in diameter and shorter in length than and communicating with said two portions, extending from said juncture of said two portions and having a communicating end portion, and a fourth electrode disposed extending into said end portion of said third portion.

14. A device according to claim 12, wherein said means defining a chamber further comprises a third portion of said tubular member equal in diameter and longer in length than and communicating with said two portions, extending from said juncture of said two portions and having a communicating end portion, and a fourth electrode disposed extending into said end portion of said third portion.

15. A device according to claim 1, wherein said means defining a chamber comprises a tubular member composed of rigid, electrically insulating material and defining a liquid flow-path having an arcuate portion corresponding to the arc of a semi-circle, a second portion extending inwardly to the center of said semi-circle, a third portion extending radially from said center towards said arcuate portion and two end portions communicating therewith, said second electrode being disposed extending into one end portion, a third electrode being disposed extending into the other end portion and said means defining said deformable interface comprising a bellows disposed at a juncture of said second and third portions and in communication with said liquid, and said bellows having a part thereof expansible in a direction outwardly of said chamber in response to the application of said force applied by said liquid upon deceleration of said vehicle.

16. A device according to claim 1, wherein said means defining a chamber comprises a tubular member composed of rigid, electrically insulating material defining a liquid flow-path having a circular shape and having two end portions in communication with said flow-path, said second electrode being disposed extending into one end portion and said means defining said deformable interface comprising a diaphragm disposed at the other end portion and in intimate contact with said liquid and having a part thereof expansible in a direction outwardly of said chamber in response to the application of said force applied by said liquid upon deceleration of said vehicle.

17. A device according to claim 1, wherein said means defining a chamber comprises a tubular member composed of rigid, electrically insulating material defining a liquid flowpath having an elliptical shape and having two end portions in communication with said flow-path, said second electrode being disposed extending into one end portion said said means defining said deformable interface comprising a diaphragm disposed at the other end portion and in intimate contact with said liquid and having a part thereof expansible in a direction outwardly of said chamber in response to the application of said force applied by said liquid upon deceleration of said vehicle.

18. A device according to claim 1, including gate circuit means connected to said second electrode for detecting the absence of said electrical signal at said second electrode and for developing another electrical signal in response to said absence of said electrical signal and safety device means receptive of said another electrical signal and actuated by same.

* * * * *